(12) United States Patent
Kato et al.

(10) Patent No.: US 10,372,972 B2
(45) Date of Patent: Aug. 6, 2019

(54) FACE DETECTION APPARATUS, FACE DETECTION METHOD, AND PROGRAM

(71) Applicant: AISIN SEIKI KABUSHIKI KAISHA, Kariya-shi, Aichi-ken (JP)

(72) Inventors: Takashi Kato, Anjo (JP); Shin Ohsuga, Nagoya (JP); Shin-ichi Kojima, Nagakute (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 103 days.

(21) Appl. No.: 14/509,486

(22) Filed: Oct. 8, 2014

(65) Prior Publication Data

US 2015/0098633 A1 Apr. 9, 2015

(30) Foreign Application Priority Data

Oct. 9, 2013 (JP) ................................ 2013-211630

(51) Int. Cl.
*G06K 9/00* (2006.01)
*G06K 9/62* (2006.01)

(52) U.S. Cl.
CPC ..... *G06K 9/00288* (2013.01); *G06K 9/00281* (2013.01); *G06K 9/00845* (2013.01); *G06K 9/6209* (2013.01)

(58) Field of Classification Search
None
See application file for complete search history.

(56) References Cited

U.S. PATENT DOCUMENTS

| | | | | |
|---|---|---|---|---|
| 6,437,808 B1* | 8/2002 | Brill, III | ................. | G06T 7/204 375/E7.084 |
| 7,756,294 B2* | 7/2010 | Toyama | ............. | G06K 9/00228 382/103 |
| 7,813,544 B2* | 10/2010 | Fukaya | ............... | G06K 9/00248 382/118 |
| 7,916,904 B2 | 3/2011 | Suzuki et al. | | |
| 8,351,658 B2 | 1/2013 | Adachi et al. | | |
| 8,472,722 B2* | 6/2013 | Nayar | ..................... | G06T 11/60 382/190 |
| 9,111,130 B2* | 8/2015 | Heckman | ............ | G06K 9/00248 |
| 9,196,074 B1* | 11/2015 | Bhat | ....................... | G06T 13/40 |
| 9,635,311 B2* | 4/2017 | Tokui | ................. | H04N 21/4223 |

(Continued)

FOREIGN PATENT DOCUMENTS

CN 100345165 C 10/2007
CN 100565583 C 12/2009
(Continued)

OTHER PUBLICATIONS

Machine Translation of JP 2010-134866 A.*
(Continued)

*Primary Examiner* — Michelle M Entezari
(74) *Attorney, Agent, or Firm* — Sughrue Mion, PLLC (57) ABSTRACT

A face detection apparatus detecting a face from an image which is captured by an imaging unit and includes the face, includes: a position detection unit that detects a position of a face part of the face from the image; an initial state determination unit that determines a model initial state on the basis of the position of the face part; and a model fitting unit that generates a model of the face on the basis of the image by using the model initial state.

7 Claims, 9 Drawing Sheets

(56) References Cited

U.S. PATENT DOCUMENTS

| | | | |
|---|---|---|---|
| 9,773,179 B2* | 9/2017 | Vicente | G06K 9/00845 |
| 2004/0005083 A1* | 1/2004 | Fujimura | A61B 3/113 |
| | | | 382/103 |
| 2005/0063582 A1* | 3/2005 | Park | G06T 17/10 |
| | | | 382/154 |
| 2006/0115157 A1* | 6/2006 | Mori | G06K 9/00221 |
| | | | 382/190 |
| 2006/0140486 A1* | 6/2006 | Kondo | G06K 9/00248 |
| | | | 382/224 |
| 2006/0177110 A1* | 8/2006 | Imagawa | G06K 9/00228 |
| | | | 382/118 |
| 2006/0204053 A1* | 9/2006 | Mori | G06K 9/00 |
| | | | 382/118 |
| 2007/0200925 A1* | 8/2007 | Kim | G06T 11/00 |
| | | | 348/14.08 |
| 2008/0130961 A1* | 6/2008 | Kinoshita | G06K 9/00281 |
| | | | 382/118 |
| 2008/0232650 A1* | 9/2008 | Suzuki | G06K 9/00281 |
| | | | 382/118 |
| 2009/0219405 A1 | 9/2009 | Kaneda et al. | |
| 2009/0316962 A1* | 12/2009 | Sun | G06K 9/00248 |
| | | | 382/118 |
| 2010/0202658 A1 | 8/2010 | Ishida et al. | |
| 2011/0052013 A1* | 3/2011 | Sasahara | G06K 9/00248 |
| | | | 382/118 |
| 2011/0274316 A1* | 11/2011 | Jeong | H04N 21/4223 |
| | | | 382/103 |
| 2012/0148159 A1 | 6/2012 | Kaneda et al. | |
| 2012/0288167 A1* | 11/2012 | Sun | G06K 9/00281 |
| | | | 382/118 |
| 2013/0215112 A1* | 8/2013 | Ho | G06F 3/011 |
| | | | 345/420 |
| 2013/0329951 A1* | 12/2013 | Kannan | G06T 7/2046 |
| | | | 382/103 |
| 2014/0009465 A1* | 1/2014 | Shen | G06T 13/40 |
| | | | 345/420 |
| 2014/0121927 A1* | 5/2014 | Hanita | B60T 7/14 |
| | | | 701/70 |
| 2014/0212030 A1* | 7/2014 | Tytgat | G06T 7/251 |
| | | | 382/154 |
| 2014/0237587 A1* | 8/2014 | Forbes | G06F 21/00 |
| | | | 726/18 |
| 2014/0341442 A1* | 11/2014 | Lewis | G06K 9/00248 |
| | | | 382/118 |
| 2015/0348257 A1* | 12/2015 | Sankaranarayanan | |
| | | | G06K 9/00228 |
| | | | 382/103 |
| 2018/0225842 A1* | 8/2018 | Wang | G06K 9/00248 |

FOREIGN PATENT DOCUMENTS

| | | |
|---|---|---|
| EP | 2 096 577 A2 | 9/2009 |
| JP | 2007-299070 A | 11/2007 |
| JP | 2008-192100 A | 8/2008 |
| JP | 2008-234208 A | 10/2008 |
| JP | 2010-134866 A | 6/2010 |
| JP | 2010-250420 A | 11/2010 |
| JP | 2011-128966 A | 6/2011 |

OTHER PUBLICATIONS

Machine Translation of JP 2007-299070A.*
Machine Translation of JP 2010-250420A.*
Machine Translation of JP 2008-192100A.*
Machine Translation of JP 2008-234208 A.*
Horprasert T, Yacoob Y, Davis LS. Computing 3-d head orientation from a monocular image sequence. InAutomatic Face and Gesture Recognition, 1996., Proceedings of the Second International Conference on Oct. 14, 1996 (pp. 242-247). IEEE. (Year: 1996).*
Horprasert T, Yacoob Y, Davis LS. An anthropometric shape model for estimating head orientation. In3rd International Workshop on Visual Form May 1997. (Year: 1997).*
Dibeklioğlu, H., Salah, A.A. and Gevers, T., 2015. Recognition of genuine smiles. IEEE Transactions on Multimedia, 17(3), pp. 279-294. (Year: 2015).*
Heo, J. and Savvdes, M., Oct. 2011, Generic 3D face pose estimation using facial shapes. In 2011 International Joint Conference on Biometrics (IJCB) (pp. 1-8). IEEE. (Year: 2011).*
Horprasert, T., Yacoob, Y. and Davis, L.S., 1997, May. An anthropometric shape model for estimating head orientation. In 3rd International Workshop on Visual Form. (Year: 1997).*
Extended European Search Report dated Mar. 18, 2015, issued by the European Patent Office in counterpart European application No. 14187706.8.
Jimenez P et al., "Face tracking and pose estimation with automatic three-dimensional model construction", IET Computer Vision, vol. 3, No. 2, Jun. 11, 2009, XP006033151, pp. 93-102.
Stan Z. Li et al., "Face Alignment Models", Handbook of Face Recognition, 2011, pp. 124 to 133, Springer.
Communication dated Jul. 6, 2017 from the Japanese Patent Office in application No. 2013-211630.
Communication dated Nov. 2, 2018, from the State Intellectual Property Office of People's Republic of China in counterpart Application No. 201410528224.X.

* cited by examiner

FACE DETECTION APPARATUS, FACE DETECTION METHOD, AND PROGRAM

CROSS REFERENCE TO RELATED APPLICATIONS

This application is based on and claims priority under 35 U.S.C. § 119 to Japanese Patent Application 2013-211630, filed on Oct. 9, 2013, the entire contents of which are incorporated herein by reference.

TECHNICAL FIELD

This disclosure relates to a face detection apparatus, a face detection method, and a program capable of detecting a position or a direction of the face from a captured image.

BACKGROUND DISCUSSION

In recent years, a face detection technique of detecting a position and a direction of the face and a state of face parts such as the eyes and the mouth included in a captured still image or a moving image has been developed. For example, in a vehicle, inattentive driving or dozing-off while driving is detected by detecting the driver's face, and thus a predetermined action such as triggering an alarm can be performed.

Stan Z. Li, Anil K. Jain, "Handbook of Face Recognition", Springer, 2011, p. 124 to 133 (Reference 1) discloses a face detection technique (active shape model: ASM, or active appearance model: AAM) of generating a model of a face in an image by fitting a statistical face model to the face in the image, that is, performing model fitting by using a steepest descent method or the like. A direction of the face or a state of a face part can be estimated by modeling the face in the image by using this technique, and time variation in the face and the face part can be monitored by updating (tracking) the model over time.

In the technique disclosed in Reference 1, accuracy of the model fitting is greatly influenced by an initial state of a model, that is, where the model is initially disposed in an image and which angle and shape the model is set to. If the initial state of the model is widely different from an actual state of the face, there is a case where calculation of model fitting for fitting the model to the actual face ends with a local optimum solution, and thus the model deviates from the actual face and converges. This is referred to as a fitting error, and if the fitting error occurs, accuracy of a model of the face is reduced. Particularly, positions of the eyes of the model tend to wrongly converge on positions of glass frames or the eyebrows.

SUMMARY

Thus, a need exists for a face detection apparatus, a face detection method, and a face detection program which is not suspectable to the drawback mentioned above.

An aspect of this disclosure is directed to a face detection apparatus detecting a face from an image which is captured by an imaging unit and includes the face, the apparatus including a position detection unit that detects a position of face part of the face from the image; an initial state determination unit that determines a model initial state on the basis of the position of the face part; and a model fitting unit that generates a model of the face on the basis of the image by using the model initial state.

According to the aspect of this disclosure, since an initial state is determined by using positions of face parts detected from an image including the face, a model initial state can be made approximate to an actual state of the face. In addition, since a model of the face is generated by using the initial state, it is possible to minimize a fitting error of a model, and to reduce a process time by making calculation converge fast.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described with reference to the drawings, but the embodiment disclosed here is not limited to the embodiment. In the drawings described below, constituent elements having the same functions are given the same reference numerals, and repeated description may be omitted.

Figure 1:
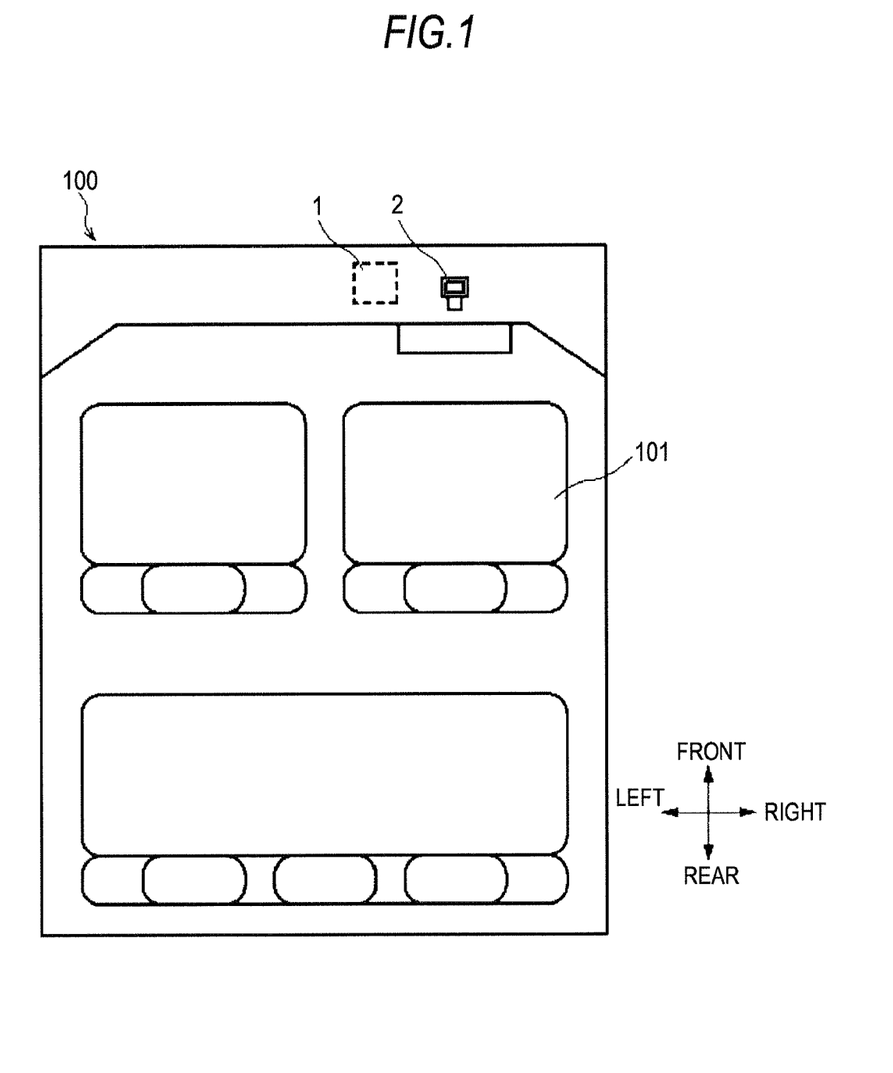
FIG. 1 is a schematic diagram of an interior of a vehicle according to an embodiment disclosed here.

FIG. 1 is a schematic diagram illustrating an interior of a vehicle 100 provided with a face detection apparatus 1 according to the present embodiment. The vehicle 100 is provided with the face detection apparatus 1 including an imaging unit 2. The face detection apparatus 1 may be provided at any location in the vehicle 100. The face detection apparatus 1 may be a standalone apparatus, and may be incorporated in another system (for example, a car navigation system) in the vehicle 100.

The imaging unit 2 is provided in front of a driver's seat 101 (that is, in a traveling direction of the vehicle 100) in the vehicle interior. The imaging unit 2 is configured to capture an image of a region including at least the face of a driver who is seated in the driver's seat 101. In the present embodiment, the imaging unit 2 is provided on a dashboard, but may be provided at a steering wheel, a ceiling, or a rear-view mirror as long as the driver's face can be imaged from the front direction.

Figure 2:
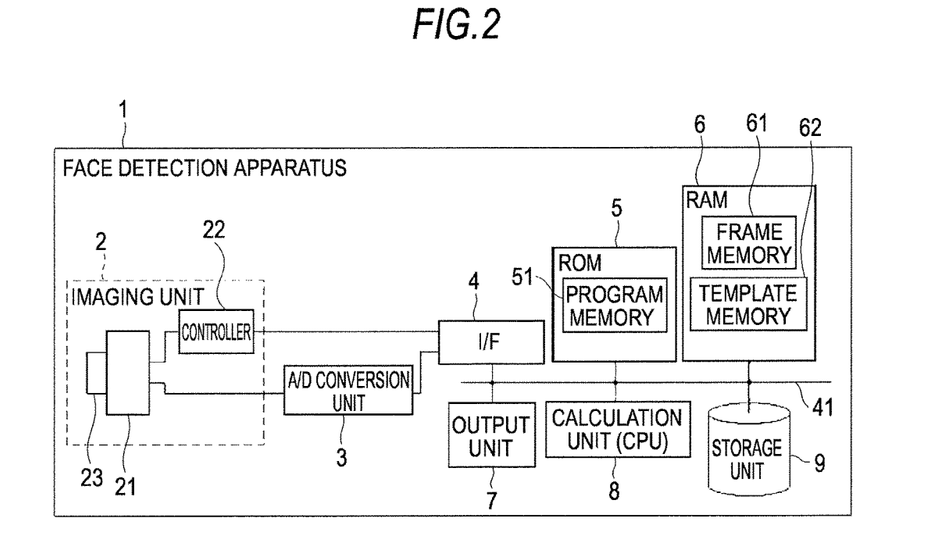
FIG. 2 is a schematic block diagram of a face detection apparatus according to the embodiment disclosed here.

FIG. 2 is a schematic block diagram of the face detection apparatus 1 according to the embodiment disclosed here. The face detection apparatus 1 includes the imaging unit 2 which captures an image of the driver's face. The imaging unit 2 includes a camera 21 provided with a lens 23 and a controller 22. The camera 21 may be a typical visible light CCD camera or MOS camera, and may be an infrared camera. The infrared camera does not depend on individual human skin colors when compared with the visible light CCD camera or MOS camera. In addition, a shutter speed of the infrared camera can be made higher than a shutter speed of the visible light CCD camera or MOS camera. The camera 21 may be a JPEG camera module. The JPEG camera module is a module in which an imaging unit is integrally formed with an A/D conversion unit, and is more lightweight and compact than the visible light CCD camera or MOS camera, and thus has superiority in a mounted position when mounted in a vehicle or the like.

The controller 22 controls the camera 21. The controller 22 performs control of automatically focusing the lens 23 on the face of the driver who is seated in the driver's seat 101 and control of opening and closing a shutter of the camera 21 for each predetermined time or in response to a signal from a CPU 8, and records captured image data in a frame memory 61 of a RAM 6 as a frame. In other words, an image captured at a certain point of time is referred to as a frame.

The face detection apparatus 1 includes the calculation unit (CPU) 8, a storage unit 9, a ROM 5, the RAM 6, an output unit 7, an interface (I/F) 4, and a bus 41. In a case where the camera 21 of the imaging unit 2 is not a JPEG camera, the face detection apparatus 1 further includes an A/D conversion unit 3. The respective constituent elements are connected to each other so as to transmit and receive signals via the bus 41.

The calculation unit 8 is constituted by a CPU, and has functions of processing and analyzing digitally converted image data from the imaging unit 2 and of performing processes such as detection of an eye part region and determination of a blinking operation according to programs. The storage unit 9 is constituted by a RAM, a hard disk, or the like, and stores image data and can store a processing result, an analysis result, and a determination result of the image data.

The output unit 7 includes, for example, a speaker, a display, and a lamp. The output unit 7 outputs sounds for giving caution or warning from the speaker on the basis of a determination result of a face detection process according to the present embodiment, or may output a message or light for giving caution or warning from the display or the lamp. In addition, the output unit 7 may transmit, for example, a signal for operating an automatic brake to an automatic brake system of the vehicle 100 on the basis of a result of the face detection process according to the present embodiment.

A speaker provided in the vehicle 100 may be used as the speaker included in the output unit 7. A display of a car navigation system provided in the vehicle 100 may be used as the display included in the output unit 7.

The A/D conversion unit 3 has a function of converting an image signal captured by the imaging unit 2 into digital image data. The image data is output to the interface (I/F) 4. The I/F 4 transmits and receives data and commands to and from the controller 22, and receives image data therefrom. The ROM 5 is a read only memory, and stores a boot program for starting the face detection apparatus 1, and includes a program memory 51 which stores programs (for example, programs for performing processes illustrated in FIGS. 6, 7 and 9 described later) for performed processes, analysis and determination. The programs may be stored not in the ROM 5 but in the storage unit 9.

The RAM 6 is used as a cache storage device of the CPU 8, and is also used as a work area when the CPU 8 executes a program for image data. The RAM 6 includes the frame memory 61 which stores image data for each frame, and a template memory 62 which stores a template.

Figure 3:
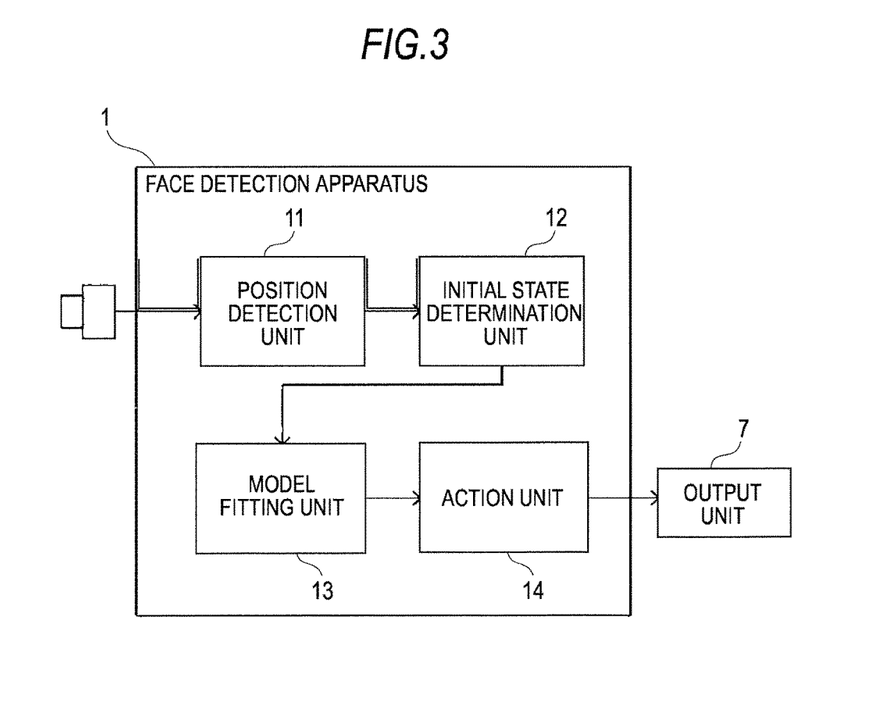
FIG. 3 is a functional block diagram of the face detection apparatus according to the embodiment disclosed here.

FIG. 3 is a functional block diagram of the face detection apparatus 1. The face detection apparatus 1 includes a position detection unit (position detection means) 11 which detects a position of a face part by using an image from the imaging unit (imaging means) 2; an initial state determination unit (initial state determination means) 12 which determines a model initial state on the basis of the position of the face part detected by the position detection unit 11; and a model fitting unit (model fitting means) 13 which generates a model of the face on the basis of an image from the imaging unit 2 by using the initial state determined by the initial state determination unit 12. The face detection apparatus 1 further includes an action unit (action means) 14 which performs a predetermined action according to a state of the model output from the model fitting unit 13.

In the face detection apparatus 1 according to the present embodiment, each of the position detection unit 11, the initial state determination unit 12, the model fitting unit 13, and the action unit 14 is stored in the ROM 5 or the storage unit 9 of the face detection apparatus 1 as a program for operating the face detection apparatus 1 which is a computer. In other words, the programs for detecting a face according to the present embodiment are read from the ROM 5 or the storage unit 9 to the RAM 6 by the CPU 8 when executed, and cause the face detection apparatus 1 which is a computer to function as the position detection unit 11, the initial state determination unit 12, the model fitting unit 13, and the action unit 14. At least some of the position detection unit 11, the initial state determination unit 12, the model fitting unit 13, and the action unit 14 may be mounted not as programs but as electric circuits. There may be a configuration in which the position detection unit 11, the initial state determination unit 12, the model fitting unit 13, and the action unit 14 are mounted not in a single apparatus but in a plurality of apparatuses separately, and the plurality of apparatuses operate as the face detection apparatus 1 according to the present embodiment in cooperation with each other.

Figure 4A:
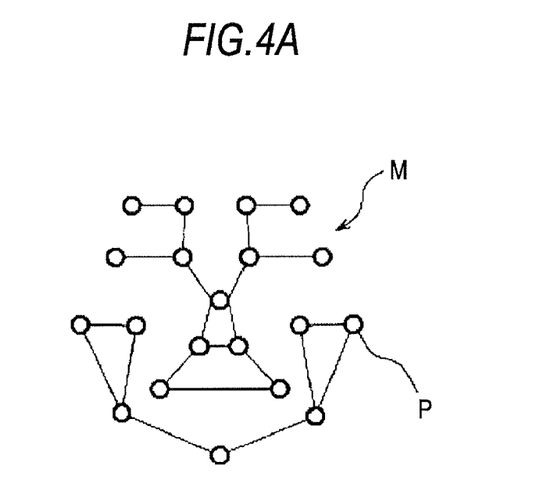
FIGS. 4A and 4B are schematic diagrams illustrating a model and a template.
Figure 4B:
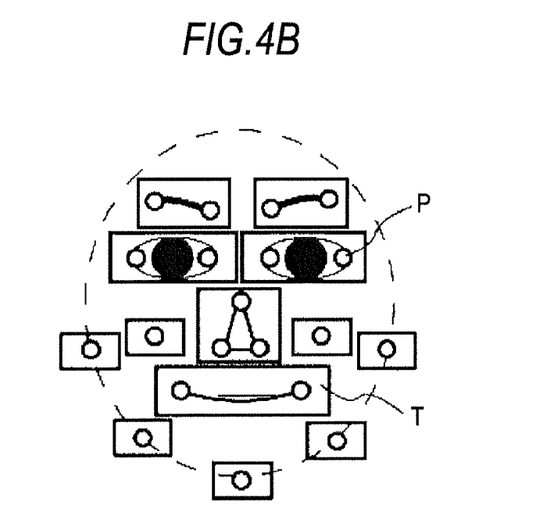

FIGS. 4A and 4B are schematic diagrams illustrating a model of the face and a template used in the present embodiment. FIG. 4A is a schematic diagram illustrating an exemplary model M of the face. The model M includes a plurality of feature points P each indicating a predetermined face part. The feature point P is expressed by coordinates with any point as an origin. FIG. 4A illustrates some of the feature points P indicating the eyes, the nose, and the mouth, but the model M may include more feature points P, and may include feature points P indicating other face parts, contours, and the like. In the present embodiment, model fitting includes generating a model M approximate to the face by fitting feature points P of a temporary model to the face in an image by using a statistical face shape model, that is, the temporary model of the average face which is created in advance, as an initial state.

FIG. 4B is a schematic diagram illustrating a template T created for the model M of the face. If the template T is created from the model M, it is possible to perform tracking of a model by using the template T. The tracking of a model includes continuously updating the model M so as to match the face in an image which is periodically captured, after the model M in the model fitting is generated. The template T has regions with a predetermined range including the feature points P in an image. For example, the template T has a region including feature points P indicating the inner corners of the eyes, a region including feature points P indicating the outer corners of the eyes, a region including feature points P indicating the nose, and a region including feature points P indicating the corners of the mouth. Each region of the template T corresponds to one or two or more feature points, and is thus associated with coordinates of the corresponding feature point. In other words, when a position of the region of the template T is defined in an image, coordinates of the feature point P corresponding to the region can be calculated.

Figure 5A:
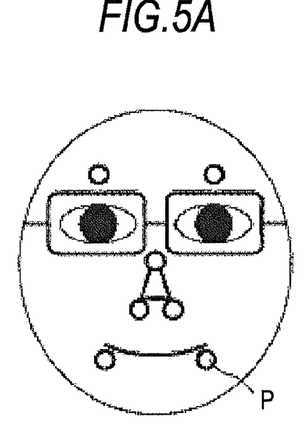
FIGS. 5A to 5D are schematic diagrams illustrating states of models before and after model fitting is performed.
Figure 5B:
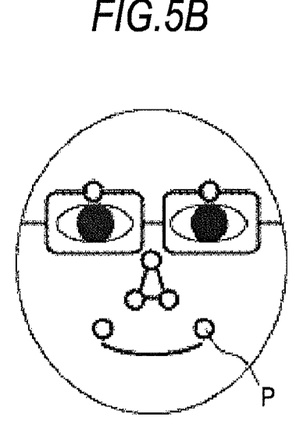

FIGS. 5A to 5D are schematic diagrams illustrating states of models before and after the model fitting is performed. In each of FIGS. 5A to 5D, the feature points P of the model are indicated by circles on an image including the driver's face. FIG. 5A illustrates a model initial state which is set to be widely different from an actual state of the face in a face detection process of the related art. FIG. 5B illustrates a model after calculation converges by performing model fitting by using the initial state of the model of FIG. 5A. In the model of FIG. 5B, the feature points P indicating the eyes are wrongly located at the glass frames, and thus the feature points P indicating the mouth are also deviated from the actual mouth. As mentioned above, in a case where a model initial state is widely different from an actual state of the face, a fitting error tends to occur.

Figure 5C:
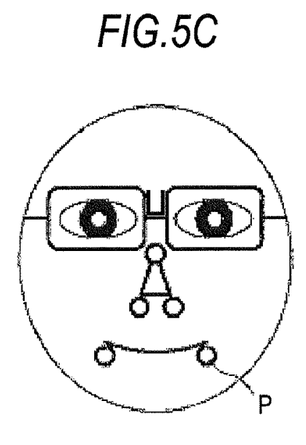
Figure 5D:
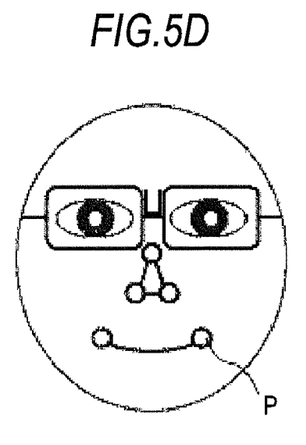

On the other hand, in a face detection process according to the present embodiment, the position detection unit 11 detects positions of face parts, specifically, positions of the eyes and the nose, and the initial state determination unit 12 determines a model initial state by using the positions, so that the initial state of the model can be made approximate to an actual state of the face. As a result, the model fitting unit 13 performs model fitting by using the initial state approximate to the actual state of the face, and thus the fitting error hardly occurs and calculation converges faster. FIG. 5C illustrates initial positions of a model which are set to be approximate to the actual state of the face in the face detection process according to the present embodiment. FIG. 5D illustrates a model after calculation converges by performing model fitting by using the model initial state of FIG. 5C. In FIG. 5D, each feature point P is located near the actual face part. As mentioned above, in the face detection process according to the present embodiment, since a model initial state can be set to be approximate to an actual state of the face, it is possible to minimize a fitting error, to improve accuracy of model fitting, and to reduce the processing time required for calculation convergence.

Figure 6:
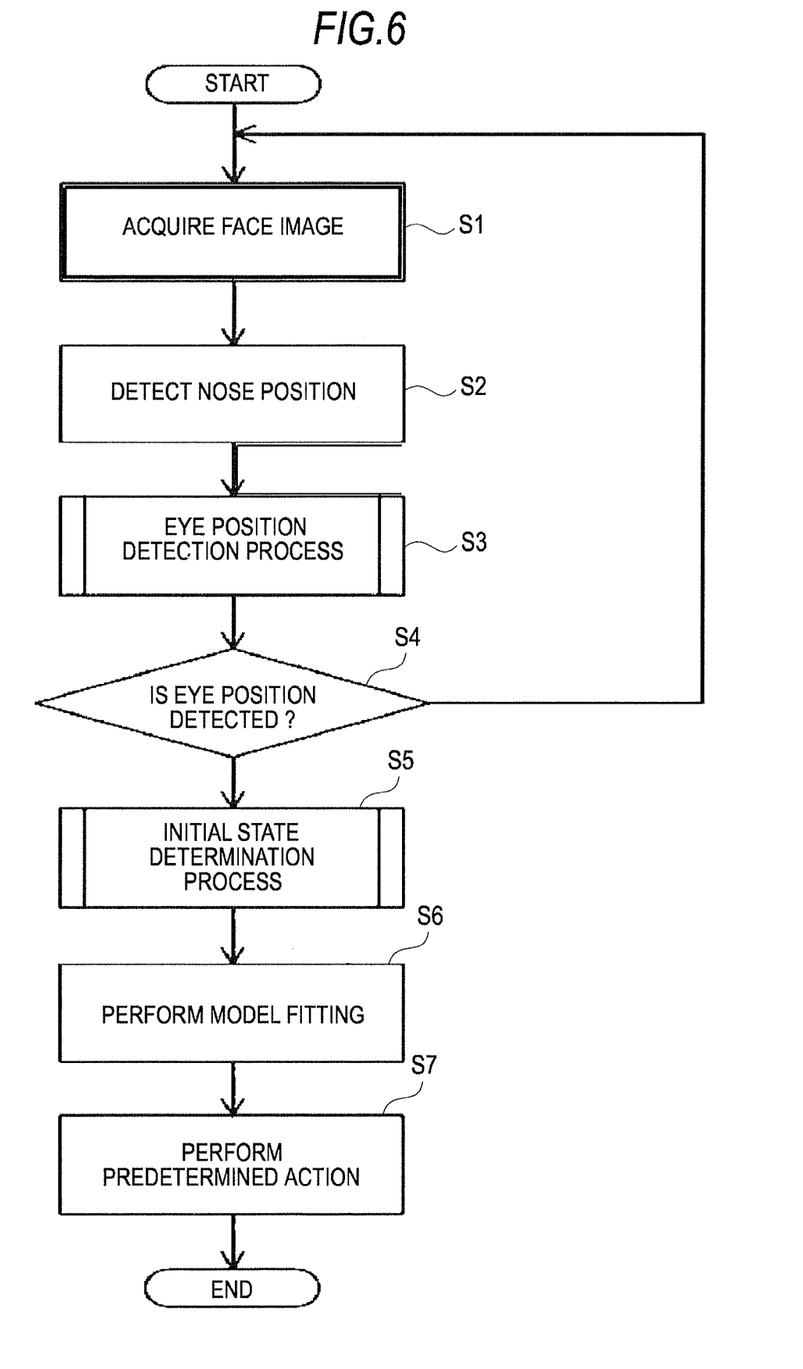
FIG. 6 is a flowchart illustrating a face detection process according to the embodiment disclosed here.

FIG. 6 is a flowchart illustrating the face detection process according to the present embodiment. The face detection apparatus 1 starts the face detection process of the flowchart of FIG. 6 when detecting that a predetermined start condition (for example, seating of a driver, turning-on of an ignition key or a specific switch by the driver, or the like) is satisfied.

The face detection apparatus 1 acquires an image of a frame which is a process target and an image of the previous frame of the frame which is a process target which are captured by the imaging unit 2, from the frame memory 61 of the RAM 6 (step S1). The images acquired in step S1 may be captured by sending a signal from the CPU 8 to the imaging unit 2 when step S1 is performed, or may be autonomously captured by the imaging unit 2 in a predetermined cycle. In either case, images captured by the imaging unit 2 are stored in the frame memory 61 of the RAM 6, and are read from the frame memory 61 of the RAM 6 in step S1. The frame memory 61 of the RAM 6 holds at least images of a frame which is a process target and the previous frame of the frame which is a process target. Since an image of the previous frame of the frame which is a process target has not yet been stored in the frame memory 61 of the RAM 6 at the time of starting of the face detection process, the face detection apparatus 1 waits for an image of the second frame to be captured, and proceeds to the next step S2 with the second frame as a frame which is a process target.

The face detection apparatus 1 detects a nose position by using the position detection unit 11 on the basis of the image of the frame which is a process target captured by the imaging unit 2, and stores the nose position in the RAM 6 (step S2). The nose position is, for example, coordinates of a specific part of the nose such as the lower end of the nose or the tip of the nose. As methods of detecting a nose position, any face part detection method in which a nose position can be specified from an image, such as a neural network method or AdaBoost method, may be used.

The face detection apparatus 1 performs an eye position detection process by using the position detection unit 11 on the basis of the image of the frame which is a process target, acquired in step S1, so as to detect eye positions in the image (step S3). If eye positions are not detected in the frame which is a process target in the eye position detection process (step S3), that is, blinking is not detected (NO in step S4), the face detection apparatus 1 performs the eye position detection process (step S3) from the image acquisition (step S1) with the next frame as a frame which is a process target.

If eye positions are detected in the frame which is a process target in the eye position detection process (step S3) (YES in step S4), the face detection apparatus 1 performs an initial state determination process by using the initial state determination unit 12 on the basis of the eye positions and the nose position detected in steps S2 and S3, so as to determine a model initial state (step S5).

The model fitting unit 13 performs model fitting so that a model is fitted to the image acquired in step S1 by using the initial state of the model determined in step S5 (step S6). A method of fitting a model in the present embodiment is not limited to a specific method, and any model fitting method such as an active appearance model (AAM) method or an active shape model (ASM) method may be used. The model fitting unit 13 stores the model generated through the model fitting in the RAM 6.

The face detection apparatus 1 performs a predetermined action by using the action unit 14 on the basis of the model generated in step S6 (step S7). For example, the action unit 14 may determine that the driver is in an inattentive driving state in a case where the model generated in step S6 is not directed toward the front side, and may output sounds or output a message or light from the output unit 7 for giving a warning. In addition, the action unit 14 may determine that the driver is in a dozing-off state while driving in a case where the model generated in step S6 remains in a state in which the eyes are closed for a predetermined amount of time or more, and may output sounds or output a message or light from the output unit 7 for giving the warning. Further, the action unit 14 may perform an operation of an automatic brake system on the basis of determination of the inattentive driving state or the dozing-off state while driving.

Although not illustrated in the flowchart of FIG. 6, model tracking can be performed by using a model generated in the face detection process according to the present embodiment. For example, the face detection apparatus 1 stores the template illustrated in FIG. 4B, obtained from the image acquired in step S1 and the model generated in step S6, in the template memory 62 of the RAM 6. Then, the face detection apparatus 1 reads an image of the next frame from the frame memory 61 of the RAM 6, and reads the template from the template memory 62 of the RAM 6, so as to scan each region of the template onto the image, thereby obtaining correlation between the region and the image at each position. The face detection apparatus 1 updates a position of each region of the template by using a position having the highest correlation, and stores a template in which the position of the region is updated in the template memory 62 of the RAM 6. Next, the face detection apparatus 1 updates coordinates of feature points of a mode associated with each region of the template on the basis of the updated template, and stores a model in which the coordinates of the feature points are updated in the RAM 6. As a result, the coordinates of each feature point of the model are updated (tracked) so as to match the image of the next frame.

Figure 7:
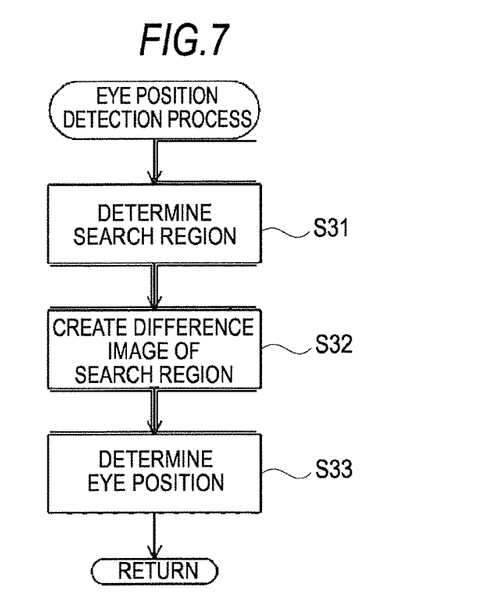
FIG. 7 is a flowchart illustrating an eye position detection process according to the embodiment disclosed here.

FIG. 7 is a flowchart of details of the eye position detection process (step S3) according to the embodiment. The position detection unit 11 determines search regions in images of the frame which is a process target and the previous frame acquired in step S1 by using the nose position detected in step S2 (step S31). Specifically, the position detection unit 11 acquires the nose position detected in step S2 from the RAM 6, and determines a peripheral region of the nose position as a search region. The search region is, for example, a rectangular region including points which are separated by predetermined distances from the nose position used as a reference, in the vertical direction and the horizontal direction. The search region has a shape and a size in which a probability of the eyes being located therein is sufficiently high, and the shape and the size may be statistically determined. An eye position determination using a difference image described later is performed only on the search region determined here, and thus it is possible to reduce a processing load and also to improve eye position detection accuracy by reducing noise due to face parts other than the eyes.

The position detection unit 11 may detect eye positions by using any face part detection method such as a neural network method or AdaBoost method, in addition to the nose position, and may determine a peripheral region of the eye positions and the nose position as a search region. The eye positions here are used only to detect a search region, and, thus, as a method of detecting eye positions, a method in which accuracy is not high and a processing load is small is preferably used. The search region in this case is, for example, a rectangular region including points which are separated by predetermined distances from the eye positions and the nose position used as references, in the vertical direction and the horizontal direction. The position detection unit 11 uses not only the nose position but also the eye positions to determine a search region in the above-described manner, and thus can use a search region which is narrower than in a case of using only the nose position for determining the search region. For this reason, a processing load in the eye position determination using a difference image can be further reduced, and noise due to face parts other than the eyes can be reduced. The position detection unit 11 does not limit a search region to a peripheral region of a nose position, and may set the entire face as a search region.

Next, the position detection unit 11 creates a difference image of the search regions determined in step S31 by using the images of the frame which is a process target and the previous frame acquired in step S1 (step S32). Specifically, the position detection unit 11 calculates differences in luminance components between the search region in the image of the previous frame and the search region in the image of the frame which is a process target. Consequently, a difference image of the search regions, for example, illustrated in FIG. 8C, is created.

Figure 8A:
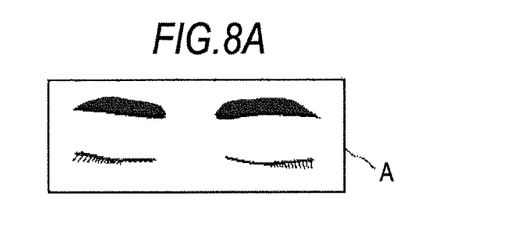
FIGS. 8A to 8C are schematic diagrams illustrating an eye position detection method according to the embodiment disclosed here.
Figure 8B:
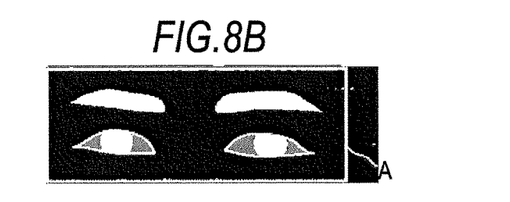
Figure 8C:
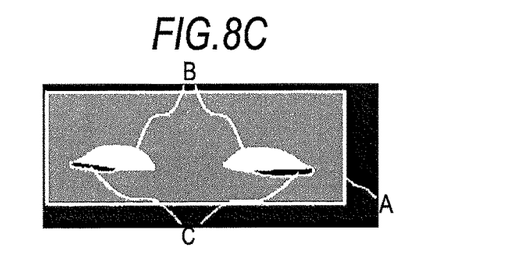

FIGS. 8A to 8C are schematic diagrams illustrating an eye position detection method according to the present embodiment. FIG. 8A illustrates a search region A in an image in a case where a driver is in a state in which the eyes are closed. FIG. 8B illustrates the search region A in the image in a case where the driver is in a state in which the eyes are open. FIG. 8C illustrates a difference image created by subtracting luminance components of the search region A of FIG. 8A from luminance components of the search region A of FIG. 8B. The difference image has a region in which luminance decreases (a black region B), a region in which luminance increases (a white region C), and a region in which luminance scarcely changes. If an eye state transitions from a state in which the eyes are closed to a state in which the eyes are open due to blinking, the large black regions B appear at positions corresponding to the eyelids in the difference image. For this reason, the position detection unit 11 determines the black regions B having an area larger than a predetermined area in the difference image created in step S32, as eye positions, and stores the eye positions in the RAM 6 (step S33). The eye positions are respectively coordinates of, for example, centroids of the black regions B. In a case where there is no black region B having an area larger than the predetermined area in the difference image, the position detection unit 11 determines that blinking is not performed in the frame, and does not detect eye positions. Transition from a state in which the eyes are open to a state in which the eyes are closed may be used to detect eye positions, and, in this case, the white regions C having an area larger than a predetermined area may be determined as the eye positions.

FIG. 8C illustrates a schematic difference image, and a plurality of black regions B may appear in parts other than the eyes in an actual difference image. In this case, the position detection unit 11 estimates black regions having the largest area as the eyes. In a case where sizes of the estimated left and right eyes are different from each other, or a gap therebetween is abnormal, for example, the gap is out of a predetermined allowable range, the position detection unit 11 estimates black regions having the second largest area as the eyes.

In the eye position detection process (step S3) according to the present embodiment, changes in the eyes due to blinking are detected by using a difference image. For this reason, it is possible to prevent the eyebrows or the glass frames from being wrongly detected as eye positions, and thus to estimate eye positions with high accuracy. The eye position detection method used in the present embodiment is not limited thereto, and any face detection method may be used in which a nose position can be specified from an image in consideration of detection accuracy and a processing load.

A frame acquisition cycle is a duration in which human blinking can be detected, that is, the duration in which an eye state changes between a state in which the eyes are closed and a state in which the eyes are open from the previous frame to a frame which is a process target. A specific numerical value of the frame acquisition cycle may be set on the basis of statistics or through tests, and the face detection apparatus 1 may set the frame acquisition cycle on the basis of a frequency of blinking of a driver.

Figure 9:
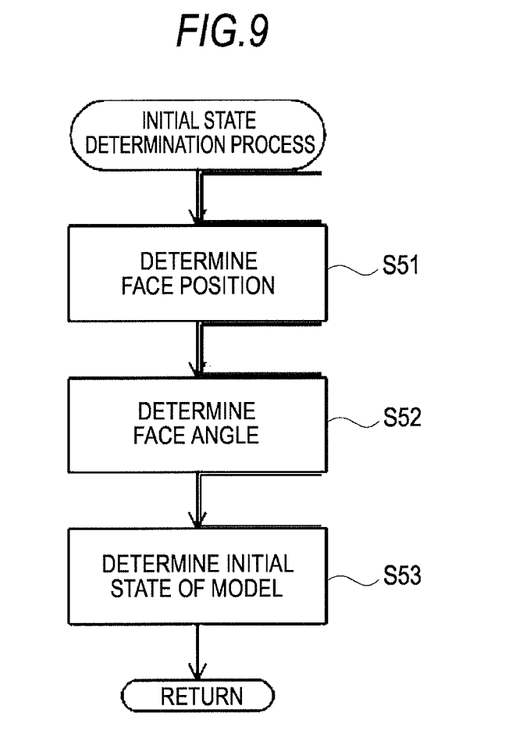
FIG. 9 is a flowchart illustrating an initial state determination process according to the embodiment disclosed here.

FIG. 9 is a flowchart illustrating details of the initial state determination process (step S5) according to the present embodiment. In the initial state determination process, the initial state determination unit 12 acquires the eye positions and the nose position detected in steps S2 and S3 from the RAM 6, and determines face positions on the basis of the eye positions and the nose position (step S51). The face positions include a face position in a plane direction and a face position in a depth direction in an image of a frame which is a process target. The initial state determination unit 12 determines the nose position detected in step S2 as the face position in the plane direction. The face position in the plane direction is used to move a model to a position of the face in an image. The initial state determination unit 12 calculates a distance between the left and right eyes at the eye positions detected in step S3, and calculates a ratio between the distance between the eyes and an average distance between the eyes in the standard face which is statistically acquired in advance, so as to determine the face position in the depth direction. The face position in the depth direction is used to enlarge or reduce a model so that the model corresponds to a size of the face in an image. A method of determining face positions is not limited to the specific method described here, and any method may be used in which face positions in an image can be determined by using the image or eye positions and nose position detected from the image.

Figure 10:
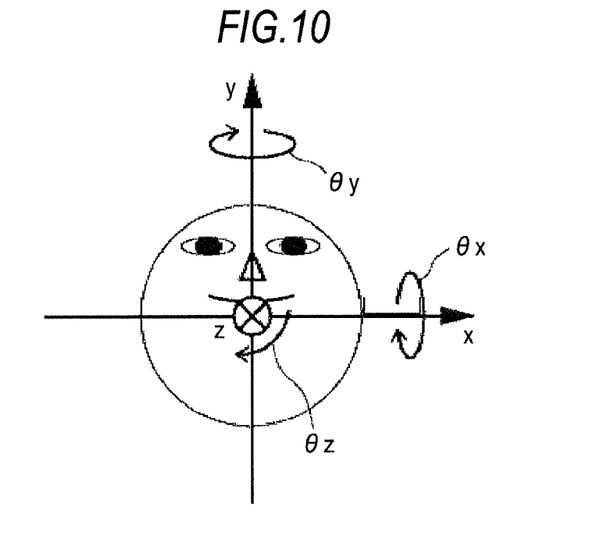
FIG. 10 is a schematic diagram illustrating a definition of a face angle.

Next, the initial state determination unit 12 acquires the eye positions and the nose position detected in steps S2 and S3 from the RAM 6, and determines face angles on the basis of the eye positions and the nose position (step S52). FIG. 10 is a schematic diagram illustrating definition of the face angles. FIG. 10 illustrates that an x axis, a y axis, and a z axis overlap the face in an image. Positions of the x axis, the y axis, and the z axis can be determined on the basis of the face positions determined in step S51. Specifically, the x axis and the y axis are straight lines, perpendicular to each other, which pass through a centroid of the face in an image and are located on a plane including the image, and the z axis is a normal of the image, passing through the centroid. The face angles include a pitch angle θx indicating a rotation angle about the x axis, a yaw angle θy indicating a rotation angle about the y axis, and a roll angle θz indicating a rotation angle about the z axis.

Figure 11A:
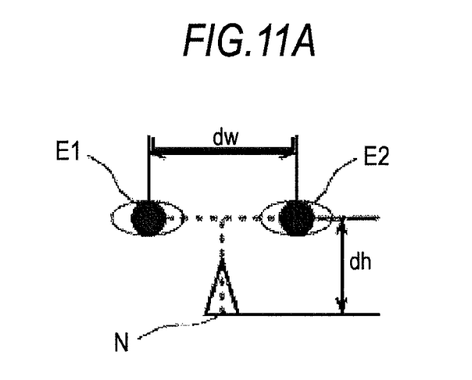
FIGS. 11A to 11C are schematic diagrams illustrating an angle calculation method according to the embodiment disclosed here.

FIG. 11A is a schematic diagram illustrating a calculation method of the pitch angle θx. A distance between left and right eyes E1 and E2 is set to dw, and a distance between a nose position N and a straight line connecting the left and right eyes E1 and E2 is set to dh. In addition, dw and dh in the standard face which is statistically acquired in advance are respectively set to dw0 and dh0. If R0=dw0/dh0, the pitch angle θx is expressed by the following Equation (1).

$$\theta x = \arccos\left(\frac{dh}{dh0 \times (dw/dw0)}\right) = \arccos\left(R0 \times \frac{dh}{dw}\right) \quad (1)$$

Figure 11B:
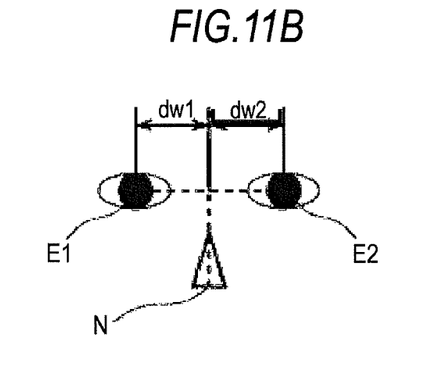

FIG. 11B is a schematic diagram illustrating a calculation method of the yaw angle θy. When a perpendicular line is drawn from the nose position N to a straight line connecting the left and right eyes E1 and E2, a distance from an intersection between the straight line and the perpendicular line to the left eye position E1 is set to dw1, and a distance to the right eye position E2 therefrom is set to dw2. In this case, the yaw angle θy is expressed by the following Equation (2).

$$\theta y = \arcsin\left(\frac{dw1 - dw2}{dw1 + dw2}\right) \quad (2)$$

Figure 11C:
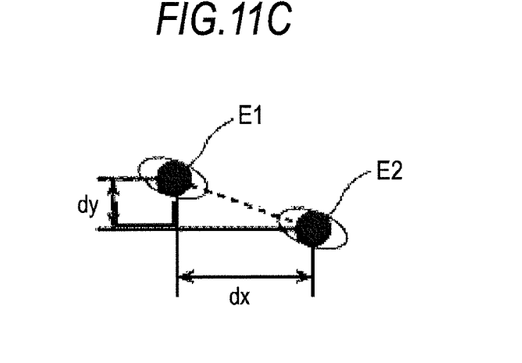

FIG. 11C is a schematic diagram illustrating a calculation method of the roll angle θz. A value obtained by subtracting an x coordinate of the left eye position E1 from an x coordinate of the right eye position E2 is set to dx, and a value obtained by subtracting a y coordinate of the left eye position E1 from a y coordinate of the right eye position E2 is set to dy. In this case, the roll angle θz is expressed by the following Equation (3).

$$\theta z = \arctan\left(\frac{dy}{dx}\right) \quad (3)$$

The initial state determination unit 12 stores face angles including the pitch angle θx, the yaw angle θy, and the roll angle θz calculated according to the above-described method, in the RAM 6. A method of determining face angles is not limited to the specific method described here, and any method may be used in which face angles in an image can be determined by using the image or a nose position and eye positions detected from the image.

The initial state determination unit 12 acquires the face positions and the face angles determined in steps S51 and S52 from the RAM 6, and determines a model initial state on the basis of the face positions and the face angles (step S53). The determination of the model initial state includes determination of positions, angles, and the like of the model at a point of time before model fitting is performed.

Figure 12A:
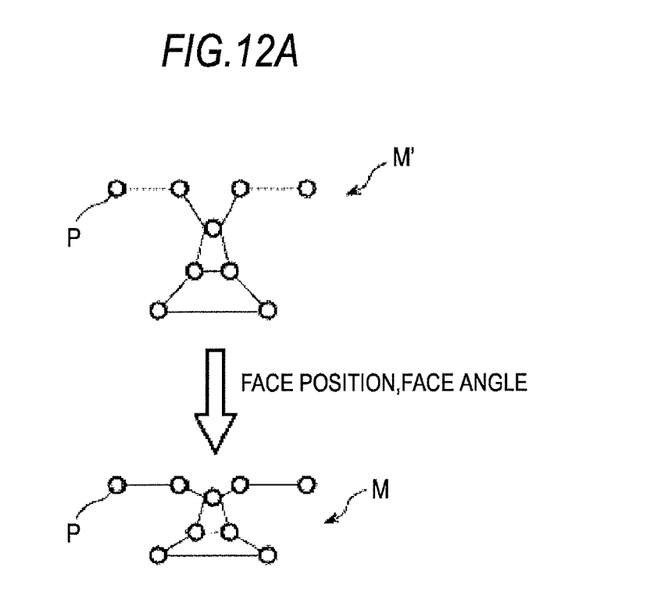
FIGS. 12A and 12B are schematic diagrams illustrating a method of setting a model initial state according to the embodiment disclosed here.
Figure 12B:
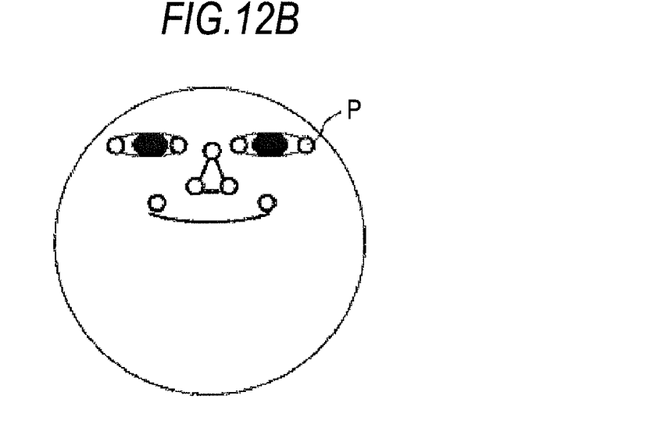

FIGS. 12A and 12B are schematic diagrams illustrating a method of determining a model initial state by using the face positions and the face angles. The initial state determination unit 12 acquires the face positions and the face angles determined in steps S51 and S52 from the RAM 6, and also acquires a statistical face shape model (temporary model M') including a plurality of feature points P from the RAM 6. As illustrated in FIG. 12A, the initial state determination unit 12 rotates the temporary model M' by using the face angles, that is, the pitch angle θx, the yaw angle θy, and the roll angle θz, moves the temporary model M' in the plane direction of the image by using the face position in the plane direction, and enlarges or reduces the temporary model M' by using the face position in the depth direction. The initial state determination unit 12 determines a model M after being modified in the above-described manner, as a model initial state, and stores the model initial state in the RAM 6. FIG. 12B illustrates a state in which the feature points P in the model initial state are superimposed on the face. The model initial state according to the present embodiment can be made approximate to an actual face state by using the acquired face positions and face angles on the basis of the image, and thus the feature points P are located near actual face parts. For this reason, in the model fitting (step S6) performed by using the model initial state, calculation converges fast, and a fitting error is minimized.

The spirit of this disclosure is that a face part is detected from an image, a model initial state is determined by using a position of the face part, and a model is generated by using the model initial state. In the present embodiment, the nose and the eyes are used as face parts, but any face part may be used as long as a position can be specified from an image. For example, the eyebrows, the mouth, contours, and the like may be used, and a combination of a plurality of face parts may be used.

In the present embodiment, although a model initial state is determined by using face positions including a position in the plane direction and a position in the depth direction, and face angles including the pitch angle θx, the yaw angle θy, and the roll angle θz, all of the above-described elements may not be used, and some of the elements may be used.

In the face detection process according to the present embodiment, since a model initial state is determined on the basis of a position of a face part detected from an image, and a model is generated by using the model initial state, the model initial state is approximate to an actual face state. For this reason, it is possible to minimize a fitting error, to improve accuracy of a model, to make convergence of calculation for generating a model fast, and to reduce a calculation load. In addition, since an additional mechanism such as a visual line detector (eye tracker) is not necessary, and both detection of a position of a face part and generation of a model are performed by using an image from a single imaging unit, it is possible to minimize an increase in cost required to improve accuracy of a model.

In the face detection process according to the present embodiment, since changes in the eyes due to blinking are detected by creating a difference image between frames, and thus eye positions are detected, it is possible to prevent the eyebrows or the glass frames from being wrongly detected as eye positions, and thus to estimate eye positions with high accuracy. In this case, since a search region in an image is restricted during creation of the difference image on the basis of a nose position detected from the image, it is possible to reduce a processing load, and thus to further improve detection accuracy. As mentioned above, in the present embodiment, by using eye positions which are estimated with high accuracy, a model initial state is accurately determined, and higher accuracy of a model is realized.

This disclosure is not limited to the above-described embodiment, and may be appropriately modified within the scope without departing from the spirit of this disclosure.

The scope of the above-described embodiment also includes a process method in which a program (for example, a program for performing the processes illustrated in FIGS. 6, 7 and 9) for operating the constituent elements of the embodiment to realize the functions of the embodiment is stored on a storage medium, and the program stored on the storage medium is read to a computer and is executed in the computer. In other words, a computer readable storage medium is also included in the scope of an embodiment according to this disclosure. In addition, not only a storage medium storing the above-described program but also the program itself is included in the above-described embodiment. As such a storage medium, for example, a floppy (registered trademark) disk, a hard disk, an optical disc, a magneto-optical disc, a CD-ROM, a magnetic tape, a non-volatile memory card, or a ROM may be used. Further, the scope of the embodiment includes not only the program alone stored on the above-described storage medium performing the processes but also the program being operated on an OS in cooperation with other software or functions of an extension board so as to perform the operation of the embodiment.

An aspect of this disclosure is directed to a face detection apparatus detecting a face from an image which is captured by an imaging unit and includes the face, the apparatus including a position detection unit that detects a position of face part of the face from the image; an initial state determination unit that determines a model initial state on the basis of the position of the face part; and a model fitting unit that generates a model of the face on the basis of the image by using the model initial state.

In the face detection apparatus according to the aspect of this disclosure, the face part may include the eye, and the position detection unit may create a difference image between an image from the imaging unit of a certain frame and an image from the imaging unit of the previous frame, and detect a position of the eye on the basis of the difference image.

In the face detection apparatus according to the aspect of this disclosure, the face part may further include the nose, and the position detection unit may determine a search region on the basis of a position of the nose detected by the position detection unit, and create the difference image in the search region.

In the face detection apparatus according to the aspect of this disclosure, the position detection unit may detect a change in the eye due to blinking on the basis of the difference image, and the initial state determination unit may determine the model initial state when the change occurs.

In the face detection apparatus according to the aspect of this disclosure, the initial state determination unit may determine a position of the face in the model initial state on the basis of the position of the face part.

In the face detection apparatus according to the aspect of this disclosure, the initial state determination unit may determine the detected position of the nose as a position of the face in a plane direction, and determine the model initial state by moving the model to the position of the face in the image using the position of the face in the plane direction.

In the face detection apparatus according to the aspect of this disclosure, the initial state determination unit may calculate the angle of the face from the position of the face part, and determine the model initial state on the basis of the angle of the face.

In the face detection apparatus according to the aspect of this disclosure, the initial state determination unit may determine a position of the face in a depth direction by calculating a distance between the left and right eyes from the detected eye position and calculating a ratio between the distance between the left and right eyes and an average distance between the eyes in a standard face which is statistically acquired in advance, and determine the model initial state by enlarging or reducing the model using the position of the face in the depth direction.

According to the aspect of this disclosure, since an initial state is determined by using positions of face parts detected from an image including the face, a model initial state can be made approximate to an actual state of the face. In addition, since a model of the face is generated by using the initial state, it is possible to minimize a fitting error of a model, and to reduce a process time by making calculation converge fast.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A face detection apparatus detecting a face from an image which is captured by an imaging unit and includes the face, the apparatus comprising:
at least one non-transitory computer readable medium operable to store program code;
at least one processor operable to read said program code and operate as instructed by the program code, the program code comprising:
a position detection unit that detects a position of a face part of the face from the image;
an initial state determination unit that determines a model initial state of a face model only on the basis of the left and right eyes and the nose; and
a model fitting unit that generates a model of the face on the basis of the image by using the model initial state, the model being generated by fitting the face model to the image captured by the imaging unit,
wherein the face part includes left and right eyes, a nose, and a mouth;
wherein the initial state determination unit calculates the angle of the face including a pitch angle, a yaw angle, and a roll angle from eye positions of the left and right eyes and a nose position, and determines face positions on the basis of the eye positions and the nose position,
wherein the face positions include a face position in a plane direction and a face position in a depth direction in an image,
wherein the initial state determination unit determines the face position in the plane direction on the basis of the nose position and the face position in the depth direction on the basis of a distance between the left eye and the right eye, and determines the model initial state on the basis of the angle of the face and the face positions,
wherein the initial state determination unit determines a position of the face in a depth direction by calculating a distance between the left and right eyes from the detected eye position and calculating a ratio between the distance between the left and right eyes and an average distance between the eyes in a standard face which is statistically acquired in advance, and determines the model initial state by enlarging or reducing the face model using the position of the face in the depth direction,
the initial state determination unit calculates the pitch angle based on the following Equation (1):

$$\theta x = \arccos\left(\frac{dh}{dh0 \times (dw/dw0)}\right) = \arccos\left(R0 \times \frac{dh}{dw}\right) \quad (1)$$

wherein a distance between the left and right eyes is set to dw, a distance between the nose position and a straight line connecting the left and right eyes is set to dh, a dw and a dh of a standard face statistically acquired in advance is set to dw0 and dh0, respectively, and the pitch angle is expressed as θx;
the initial state determination unit calculates the yaw angle based on the following Equation (2):

$$\theta y = \arcsin\left(\frac{dw1 - dw2}{dw1 + dw2}\right) \quad (2)$$

wherein a perpendicular line is drawn from the nose position to the straight line connecting the left and right eyes, a distance from an intersection between the straight line and the perpendicular line to the left eye position is set to dw1, a distance to the right eye position therefrom is set to dw2, and the yaw angle is expressed as θy; and
the initial state determination unit calculates the roll angle based on the following Equation (3):

$$\theta z = \arctan\left(\frac{dy}{dx}\right) \quad (3)$$

wherein a value obtained by subtracting an x coordinate of the left eye position from an x coordinate of the right eye position is set to dx, a value obtained from subtracting a y coordinate of the left eye position from a y coordinate of the right eye position is set to dy, and the roll angle is expressed as θz.

2. The face detection apparatus according to claim 1, wherein the position detection unit creates a difference image between an image from the imaging unit of a certain frame and an image from the imaging unit of the previous frame, and detects a position of the eye on the basis of the difference image.

3. The face detection apparatus according to claim 2, wherein the position detection unit determines a search region on the basis of a position of the nose detected by the position detection unit, and creates the difference image in the search region.

4. The face detection apparatus according to claim 2, wherein the position detection unit detects a change in the eye due to blinking on the basis of the difference image, and the initial state determination unit determines the model initial state when the change occurs.

5. The face detection apparatus according to claim 1, wherein the initial state determination unit determines a position of the face in the model initial state on the basis of the positions of the face parts.

6. The face detection apparatus according to claim 1, wherein the initial state determination unit determines the detected position of the nose as a position of the face in a plane direction, and determines the model initial state by moving the face model to the position of the face in the image using the position of the face in the plane direction.

7. A face detection apparatus detecting a face from an image which is captured by an imaging unit and includes the face, the apparatus comprising:
at least one non-transitory computer readable medium operable to store program code;
at least one processor operable to read said program code and operate as instructed by the program code, the program code comprising:
a position detection unit that detects a position of a face part of the face from the image;
an initial state determination unit that determines a model initial state of a face model on the basis of the position of the face part; and a model fitting unit that generates a model of the face on the basis of the image by using the model initial state, the model being generated by fitting the face model to the image captured by the imaging unit, wherein the face part includes left and right eyes and a nose, wherein the initial state determination unit calculates the angle of the face including a pitch angle, a yaw angle, and a roll angle from eye positions of the left and right eyes and a nose position, and determines face positions on the basis of the eye positions and the nose position, wherein the face positions include a face position in a plane direction and a face position in a depth direction in an image, wherein the initial state determination unit determines the face position in the plane direction on the basis of the nose position and the face position in the depth direction on the basis of a distance between the left eye and the right eye, and determines the model initial state on the basis of the angle of the face and the face positions, and wherein the initial state determination unit determines a position of the face in a depth direction by calculating a distance between the left and right eyes from the detected eye position and calculating a ratio between the distance between the left and right eyes and an average distance between the eyes in a standard face which is statistically acquired in advance, and determines the model initial state by enlarging or reducing the model using the position of the face in the depth direction, the initial state determination unit acquires a temporary model and rotates the temporary model by using the face angles and moves the temporary model in the plane direction of the image by using the face position in the plane direction and enlarges or reduces the temporary model by using the face position in the depth direction and determines the face model by modifying the temporary model, the initial state determination unit calculates the pitch angle based on the following Equation (1):

$$\theta x = \arccos\left(\frac{dh}{dh0 \times (dw/dw0)}\right) = \arccos\left(R0 \times \frac{dh}{dw}\right) \quad (1)$$

wherein a distance between the left and right eyes is set to dw, a distance between the nose position and a straight line connecting the left and right eyes is set to dh, a dw and a dh of a standard face statistically acquired in advance is set to dw0 and dh0, respectively, and the pitch angle is expressed as θx;

the initial state determination unit calculates the yaw angle based on the following Equation (2):

$$\theta y = \arcsin\left(\frac{dw1 - dw2}{dw1 + dw2}\right) \quad (2)$$

wherein a perpendicular line is drawn from the nose position to the straight line connecting the left and right eyes, a distance from an intersection between the straight line and the perpendicular line to the left eye position is set to dw1, a distance to the right eye position therefrom is set to dw2, and the yaw angle is expressed as θy; and the initial state determination unit calculates the roll angle based on the following Equation (3):

$$\theta z = \arctan\left(\frac{dy}{dx}\right) \quad (3)$$

wherein a value obtained by subtracting an x coordinate of the left eye position from an x coordinate of the right eye position is set to dx, a value obtained from subtracting a y coordinate of the left eye position from a y coordinate of the right eye position is set to dy, and the roll angle is expressed as θz.

\* \* \* \* \*